United States Patent
Wang et al.

(10) Patent No.: US 10,521,898 B2
(45) Date of Patent: Dec. 31, 2019

(54) STRUCTURAL MASKING FOR PROGRESSIVE HEALTH MONITORING

(71) Applicant: Sikorsky Aircraft Corporation, Stratford, CT (US)

(72) Inventors: Hongcheng Wang, Farmington, CT (US); Paul Attridge, Colchester, CT (US); Ziyou Xiong, Wethersfield, CT (US); Alan Matthew Finn, Hebron, CT (US); Zaffir A. Chaudhry, South Glastonbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 251 days.

(21) Appl. No.: 15/541,574

(22) PCT Filed: Jan. 5, 2016

(86) PCT No.: PCT/US2016/012196
§ 371 (c)(1),
(2) Date: Jul. 5, 2017

(87) PCT Pub. No.: WO2016/112018
PCT Pub. Date: Jul. 14, 2016

(65) Prior Publication Data
US 2018/0005362 A1 Jan. 4, 2018

Related U.S. Application Data

(60) Provisional application No. 62/100,243, filed on Jan. 6, 2015.

(51) Int. Cl.
*G06T 7/00* (2017.01)
*G06K 9/03* (2006.01)
(Continued)

(52) U.S. Cl.
CPC .............. *G06T 7/001* (2013.01); *G06K 9/036* (2013.01); *G06T 3/0075* (2013.01); *G06T 7/11* (2017.01);
(Continued)

(58) Field of Classification Search
CPC .......... G06K 9/036; G06T 2207/20212; G06T 2207/20224; G06T 2207/30164;
(Continued)

(56) References Cited

U.S. PATENT DOCUMENTS 4,477,926 A 10/1984 Linger et al.
2002/0110278 A1 8/2002 Lee et al.
(Continued)

OTHER PUBLICATIONS

PCT/US2016/012196, IPRP, dated Jul. 20, 2017, 6 pages.
(Continued)

*Primary Examiner* — Nirav G Patel
(74) *Attorney, Agent, or Firm* — Cantor Colburn LLP

(57) ABSTRACT

A method of structural masking for progressive health monitoring of a structural component includes receiving a current image of the structural component. A processor aligns the current image and a reference image of the structural component. The processor performs a structure estimation on the current image and the reference image to produce a current structure estimate image and a reference structure estimate image. The processor generates a structural mask from the reference structure estimate image. The processor masks the current structure estimate image with the structural mask to identify one or more health monitoring analysis regions including a potential defect or damaged area appearing in the masked current structure estimate image that does not appear in the reference structure estimate image.

14 Claims, 4 Drawing Sheets

(51) Int. Cl.
*G06T 7/11* (2017.01)
*G06T 3/00* (2006.01)
(52) U.S. Cl.
CPC ............... *G06T 2207/20212* (2013.01); *G06T 2207/30164* (2013.01); *G06T 2207/30168* (2013.01)
(58) Field of Classification Search
CPC ......... G06T 2207/30168; G06T 3/0075; G06T 7/001; G06T 7/11
See application file for complete search history.

(56) References Cited

U.S. PATENT DOCUMENTS

| | | | |
|---|---|---|---|
| 2005/0265605 A1 | 12/2005 | Nakamoto et al. | |
| 2006/0093205 A1 | 5/2006 | Bryll et al. | |
| 2007/0047840 A1* | 3/2007 | Xu | G06K 9/3216 382/294 |
| 2008/0049994 A1 | 2/2008 | Rognin et al. | |
| 2009/0010540 A1 | 1/2009 | Mullick et al. | |
| 2010/0124362 A1* | 5/2010 | Wu | G03G 15/0152 382/112 |
| 2010/0128954 A1* | 5/2010 | Ostrovsky-Berman | G06T 7/187 382/131 |
| 2011/0249872 A1 | 10/2011 | Monro | |
| 2015/0078627 A1* | 3/2015 | Fukase | G06T 7/001 382/112 |

OTHER PUBLICATIONS

PCT/US2016/012196, ISR/WO, dated Mar. 16, 2016, 9 pages.
ISR/WO, dated Mar. 16, 2016.
Ajay Pal Singh Chauhan et al., "Detection of Bare PCB Defects by Image Substraction Method using Machine Vision"; World Congress on Engineering 2011 vol. II WCE 2011, Jul. 6, 2011 (Jul. 6, 2011), pp. 1-5, XP055473940.
Hiroi et al., "Precise visual inspection for LSI wafer patterns using subpixel image alignment", Applications of Computer Vision, 1994., Proceedings of the Second IEEE Workshop on Sarasota, FL, USA Dec. 5-7, Los Alamitos, CA, USA, IEEE Comput. Soc, Dec. 5, 1994 (Dec. 5, 1994), pp. 26-34, XP010100084.
EP 16735303.6, EESR dated Oct. 5, 2018, 16 pages.

* cited by examiner

STRUCTURAL MASKING FOR PROGRESSIVE HEALTH MONITORING

CROSS-REFERENCE TO RELATED APPLICATIONS

The present application is a 371 National Stage of International Patent Application No. PCT/US16/12196, filed on Jan. 5, 2016, which claims priority to U.S. Provisional Application No. 62/100,243, filed on Jan. 6, 2015, the contents of which are incorporated herein by reference in their entirety.

BACKGROUND OF THE INVENTION

The subject matter disclosed herein relates generally to the field of structural health monitoring and, more particularly, to structural masking for progressive health monitoring of a structural component.

Visual inspection has been used in the aerospace industry for detecting aircraft surface and sub-surface defects. Typical defects in aircraft structures include cracks, corrosion, and disbonding. Visual inspection (such as by a person) has been widely used for detecting cracks in aircraft structures as it is often an economical and quick method to gauge a condition of the aircraft structure (notwithstanding the questionable reliability of human inspection). Cracks typically appear in areas that experience fatigue such as, for example, at holes for rivets, bolts, etc. These areas, commonly referred to as "hot spots" may be located in certain inaccessible areas of the aircraft, for example hidden behind other structures or panels, and may not be amenable to visual inspection. These hot spots may be manually inspected by remote imaging methods, e.g., utilizing a borescope, and include preferential inspection of analytically predicted hot spot locations. However, these manual image-based methods can be cumbersome and are used in limited circumstances.

BRIEF DESCRIPTION OF THE INVENTION

According to an aspect of the invention, a method of structural masking for progressive health monitoring of a structural component includes receiving a current image of the structural component. A processor aligns the current image and a reference image of the structural component. The processor performs a structure estimation on the current image and the reference image to produce a current structure estimate image and a reference structure estimate image. The processor generates a structural mask from the reference structure estimate image. The processor masks the current structure estimate image with the structural mask to identify one or more health monitoring analysis regions including a potential defect or damaged area appearing in the masked current structure estimate image that does not appear in the reference structure estimate image.

In addition to one or more of the features described above or below, or as an alternative, further embodiments could include performing an image quality evaluation to determine whether the current image meets a plurality of image quality metrics, and based on determining that the current image fails to meet the image quality metrics, determining whether an enhancement of the current image meets the plurality of image quality metrics. Based on determining that the enhancement of the current image fails to meet the image quality metrics, the current image can be rejected and monitoring for another instance of the current image can be performed.

In addition to one or more of the features described above or below, or as an alternative, further embodiments could include where aligning the current image and the reference image further includes applying a rigid model to translate, scale or rotate the current image for subpixel-level alignment with the reference image.

In addition to one or more of the features described above or below, or as an alternative, further embodiments could include where aligning the current image and the reference image further includes applying a non-rigid model to skew or reshape the current image for feature alignment with the reference image at a subpixel level.

In addition to one or more of the features described above or below, or as an alternative, further embodiments could include where the structure estimation includes estimating linear or curve-like structures.

In addition to one or more of the features described above or below, or as an alternative, further embodiments could include where generation of the structural mask is obtained by dilation of the reference structure estimate image.

In addition to one or more of the features described above or below, or as an alternative, further embodiments could include where progressive crack detection is applied to a series of multiple images of the structural component after structural masking is applied to the images by performing additional steps including: detecting a plurality of points in the images after the structural masking, performing line segment formation by tracking the points, estimating feature growth with respect to time between a plurality of the images, evaluating the severity of the defects, and predicting the remaining structural life.

In addition to one or more of the features described above or below, or as an alternative, further embodiments could include where estimating feature growth further includes determining one or more of: a length of growth with respect to the reference image, a location of growth with respect to the reference image, a length of growth with respect to a sequence of images, and a location of growth with respect to the sequence of images.

According to further aspects of the invention, a system for progressive health monitoring of a structural component using structural masking includes an image processing computer having a processor and memory. The system also includes a camera that captures a current image of the structural component. The memory includes instructions stored thereon that, when executed by the processor, cause the system to align the current image and a reference image of the structural component, and perform a structure estimation on the current image and the reference image to produce a current structure estimate image and a reference structure estimate image. A structural mask is generated from the reference structure estimate image. The current structure estimate image is masked with the structural mask to identify one or more health monitoring analysis regions including a potential defect or damaged area appearing in the masked current structure estimate image that does not appear in the reference structure estimate image.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
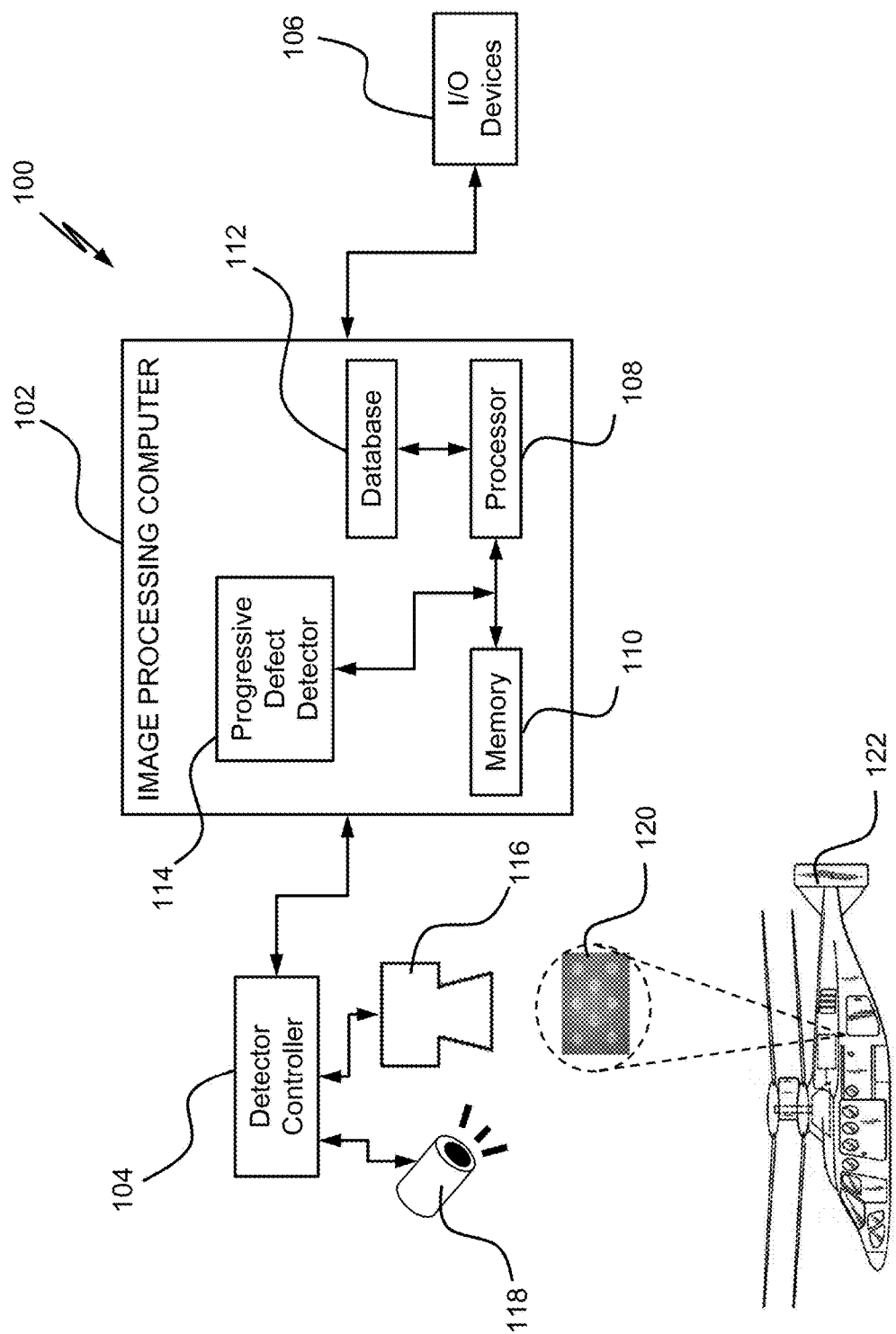
FIG. 1 is a schematic view of an exemplary computing system according to an embodiment of the invention.

In exemplary embodiments, structural masking is provided for image-based progressive crack detection for sequential hot spot monitoring, by comparing a current test image with one or more prior stored reference images. A reference image may be a prior image from a camera or may be information in an equivalent format based on the part design, e.g., from a computer-aided drafting (CAD) model. Structural masking enables further processing to focus on the unusual structures identified as one or more health monitoring analysis regions in the current test image by ignoring expected structures (or prior damage) from a reference image. Embodiments may also perform crack propagation analysis over time using, for example, multiple images for comparison that are acquired over a period of time.

Hot spots can be onboard or remotely monitored with a compact self-contained camera which may have a wired or wireless connection to computational, display, and alerting resources. For remote monitoring, the camera can take a picture at a requisite time or interval and transmit the image to an outside analysis station for automated damage detection and assessment. The same automated process may be performed onboard with other notification processes when damage is detected on a structural component that is under observation. The damage may be detected by reference to one or more previous images designated as a reference image. In the context of an aircraft, an image of a hot spot may be available every flight or couple of flights such that the hot spot can be very effectively monitored for the appearance of damage or growth of damage, and a maintenance action taken to maintain safety of the aircraft.

This method of monitoring can be employed for "fleet" monitoring when damage is observed on one aircraft and there is concern about the same type of damage occurring in multiple aircraft in the fleet.

An imaging system can acquire and store multiple images over time to discover a trend of damage inception and propagation. The progressive evolution of fatigue crack damage over time enables robust detection using multiple images spanning that period. In this context, the stored images are called reference images. Image subtraction techniques can be used to find the differences between a current image and stored reference images for change detection, moving object detection, etc. The term "current image" refers to an image currently under test with respect to an older reference image, and need not actually be the latest image captured by the imaging system.

The term "structure" as used herein refers to geometric features, such as lines or curves that are inherent in the structural component under observation. Cracks can be represented as piecewise curve-like, linear structures or branching (tree-like) shape. The structural masking focuses on the unusual structures in the current image by ignoring the expected structures from the reference image. Structures in the reference image typically also appear in the current image; therefore, these structures can be masked out or ignored. However, the structures which are in the current image but not in the reference image are likely to be associated with cracks, and thus are identified as one or more health monitoring analysis regions for further analysis.

Referring to the drawings, FIG. 1 illustrates a schematic block diagram of a structural monitoring system 100 according to an embodiment of the invention. The structural monitoring system 100 includes a progressive defect detector 114 for detecting structural issues in a structural component 120 in, for example, a rotary-wing aircraft 122. The progressive defect detector 114 can obtain and apply a structural mask to identify one or more health monitoring analysis regions in an image of the structural component 120 for further analysis, such as crack detection and crack propagation.

As illustrated, the structural monitoring system 100 includes an image processing computer 102, a detector controller 104, and input/output (I/O) devices 106. The image processing computer 102 may be implemented as a workstation, such as a PC or a server, located onboard or remotely from the rotary-wing aircraft 122. The image processing computer 102 includes a memory 110 that communicates with a processor 108. The memory 110 may store a progressive defect detector 114 as executable instructions that are executed by the processor 108. The executable instructions may be stored or organized in any manner and at any level of abstraction, such as in connection with the execution of the progressive defect detector 114. The processor 108 may be any type of processor (CPU), including a general purpose processor, a digital signal processor, a microcontroller, an application specific integrated circuit, a field programmable gate array, or the like. In an embodiment, the processor 108 may include an image processor in order to process, through the use of additional processing algorithms, video and/or still image data that are captured by camera 116. Also, in embodiments, memory 110 may include random access memory (RAM), read only memory (ROM), or other electronic, optical, magnetic, or any other computer readable medium onto which is stored the progressive defect detector 114 described below. The image processing computer 102 may include a database 112 in data communication with the processor 108. The database 112 may be used to store image and video data of structural component 120 of, for example, the rotary-wing aircraft 122 as well as any other data and algorithms that are used to implement the progressive defect detector 114. Although this invention has been disclosed in embodiments as being applied to a rotary-wing aircraft 122, it is to be appreciated that the embodiments described herein may be applied to other vehicles or structures for which defect identification is being determined.

Also illustrated, the structural monitoring system 100 includes a detector controller 104 in two-way communication with the image processing computer 102. The detector controller 104 can be separate from or integrated with the image processing computer 102, for instance, as part of an embedded system of the rotary-wing aircraft 122. The detector controller 104 is in data communication with, for example, a plurality of light emitting diodes (LEDs) 118 and camera 116 over a wired or wireless connection. In an embodiment, the camera 116 may be a two-dimensional (2D) or three-dimensional (3D) camera with an illumination source, e.g., a built-in plurality of LEDs 118, and the detector controller 104 but, in other embodiments, the camera 116 may be remote from the detector controller 104 and the plurality of LEDs 118, or a combination thereof. In a non-limiting example, the camera 116 is a three color RGB camera with a 120-degree field of view and may include a plurality of LEDs built into its housing, may include a resolution of 1 millimeter at 3 meters, may include a range of 2 centimeters to 3 meters, may include on-board image processing to interface with the detector controller 104 or directly with the image processing computer 102, and may include wireless capability to transmit input images to a remote processor. In one example, the remote processor is the processor 108. Also, a polarizer may be coupled to the camera 116 in order to remove specular reflections from camera images received by the camera 116. In embodiments, an infrared camera coupled to an infrared illuminator, or other detector may be used in combination with the camera 116 or in lieu of the camera 116.

The terms "sensor", "camera", and "video" are used generically in this disclosure for any 2D or 3D (depth) sensing device. As known in the contemporary art, there are multiple depth sensing technologies including, but not limited to, structured light, phase shift, time of flight, stereo triangulation, sheet of light triangulation, light field cameras, coded aperture cameras, computational imaging techniques like depth from defocus, structure from motion (SFM), simultaneous localization and mapping (SLAM), imaging radar, imaging sonar, scanning LIDAR, flash LIDAR, etc. Different technologies may be active or passive and are operable in various bands of the electromagnetic or acoustic spectrum.

There are both qualitative and quantitative differences between conventional 2D imaging and 3D depth sensing which make depth sensing preferable in some applications. In 2D imaging, the reflected color (mixture of wavelengths) from the first object in each radial direction from the camera is captured in an image. The image, then, is the combined spectrum of the source illumination and the spectral reflectivity of objects in the scene. In 3D depth sensing there is no color (spectral) information. Rather, the distance (depth, range) to the first reflective object in each radial direction from the camera is captured. Most 3D technologies have inherent limits on the maximum detectable range (often quite short range) and are of much lower spatial resolution than typical 2D cameras.

The detector controller 104 may include its own memory and processor that respectively store and process instructions for, in some examples, controlling the positioning and modulation of a light beam directed from a plurality of LEDs 118. Each of the plurality of LEDs 118 may be coupled to a polarizer in order to remove specular reflections in the image data from a surface of the structural component 120 being illuminated. In an embodiment, each plurality of LEDs 118 may be directed by the detector controller 104 to be selectively turned ON and illuminate a portion of structural component 120 while the camera 116 is capturing an image or video of the structural component 120. Alternatively, the plurality of LEDs 118 may be selectively and remotely controlled by the image processing computer 102 through direction by a user via wired or wireless signals sent from the image processing computer 102 or I/O devices 106. In an embodiment, the plurality of LEDs 118 may be placed substantially around rivet locations of interest to provide directional illumination, and obtain a set of images manually through user input or by the application of the progressive defect detector 114. In an embodiment, the LEDs 118 may be modulated so that one or more of the plurality of LEDs 118 may be individually and selectively turned ON. In this way, the system may provide for capturing optimal images for processing. A processor of the detector controller 104 may be any type of processor (CPU), including a graphics processing unit (GPU), a general purpose processor, a digital signal processor, a microcontroller, an application specific integrated circuit, a field programmable gate array, or the like. Also, memory of the detector controller 104 may include random access memory (RAM), read only memory (ROM), or other storage such as an electronic, an optical, a magnetic, or any other computer readable medium. It is to be appreciated that the progressive defect detector 114 may also be utilized for detecting a variety of damage/defects such as cracks, corrosion, etc.

The image processing computer 102 may provide one or more directives to the detector controller 104 such as, for example, positioning the plurality of LEDs 118, turning ON the plurality of LEDs 118, or changing a direction of the plurality of LEDs 118 in response to camera image data that is acquired by the camera 116 for the structural component 120. Directives provided by the image processing computer 102 may be received from one or more input/output (I/O) devices 106. The I/O devices 106 may include a display device or screen, audio speakers, a graphical user interface (GUI), keyboard, microphone for voice recognition, etc. In some embodiments, the I/O devices 106 may be used to enter or adjust configuration parameters and/or a mode of operation.

It is to be appreciated that structural monitoring system 100 is illustrative. In some embodiments, additional components or entities not shown in FIG. 1 may be included. In some embodiments, one or more of the components or entities may be optional. In some embodiments, the components or entities of structural monitoring system 100 may be arranged or configured differently from what is shown in FIG. 1. For example, in some embodiments, the detector controller 104 may be commanded by the I/O devices 106, as opposed to being commanded by the processor 108 or the image processing computer 102 as shown in FIG. 1.

Figure 2:
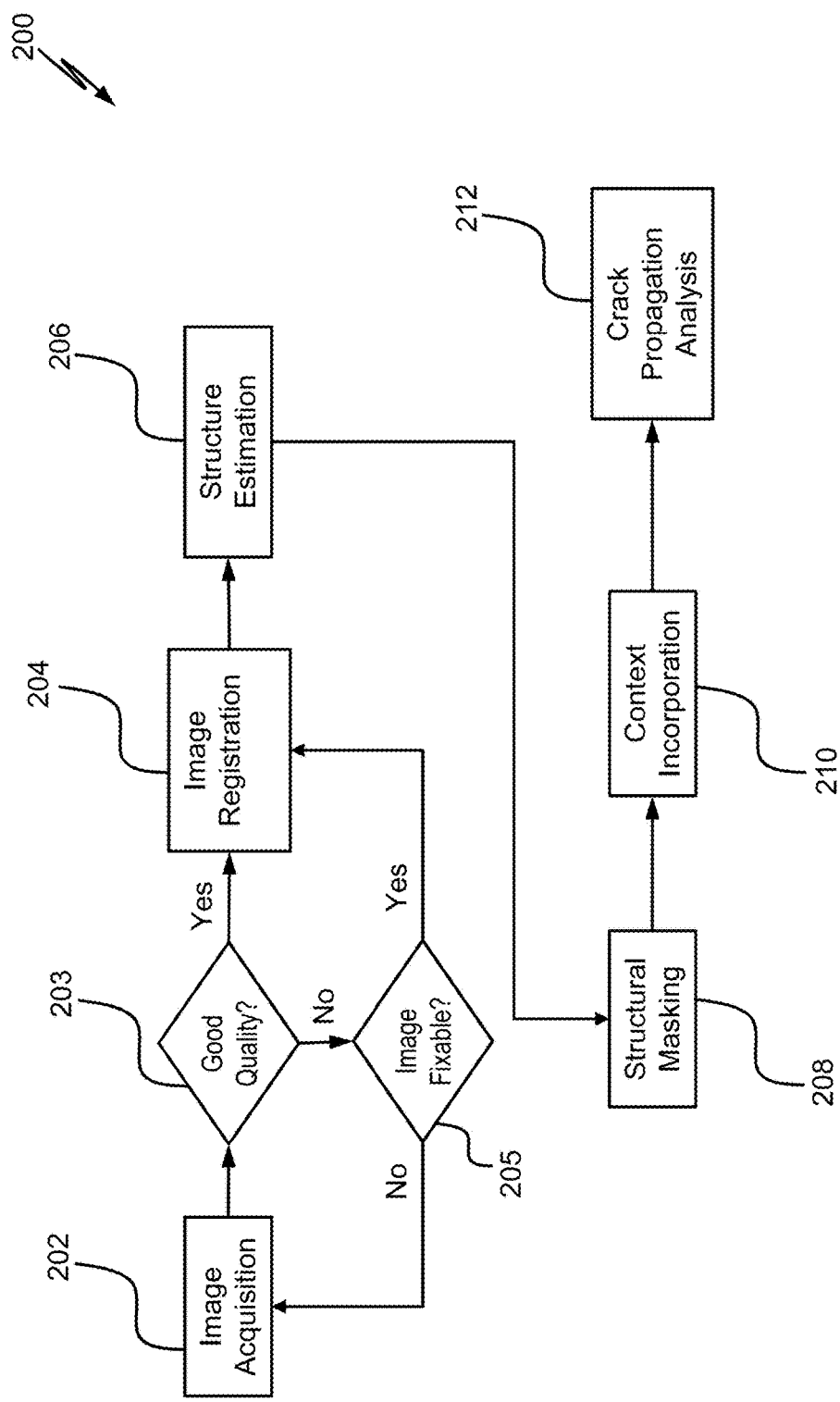
FIG. 2 illustrates a dataflow diagram according to an embodiment of the invention.
Figure 3:
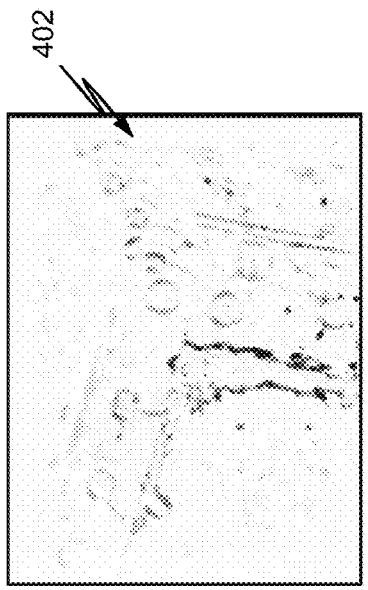
FIG. 3 illustrates an example of applying structure estimation to a reference image according to an embodiment of the invention.

FIG. 2 illustrates an exemplary data flow diagram 200 for the progressive defect detector 114 of FIG. 1 that monitors for hot spots in the structural component 120 of FIG. 1 as one or more health monitoring analysis regions according to an embodiment of the invention. With continued reference to FIG. 1, implementation of the progressive defect detector 114 begins with receiving one or more images from the camera 116 at block 202. Particularly, signals indicative of at least one image of the structural component 120 are received by the camera 116. In an embodiment, the camera 116 may take a still camera image or a video image at a requisite time or interval while focused on the structural component 120. Images acquired by the camera 116 may be preprocessed by the detector controller 104 or sent directly to the progressive defect detector 114 for further processing. In an embodiment, at least one image of one or multiple rivets or other structures of the structural component 120 are acquired through a wide field of view of the camera 116. A current image captured by the camera 116 can be received by the detector controller 104, which transmits the current image to the image processing computer 102 for analysis (i.e., crack detection and/or propagation) in the structural component 120. In an embodiment, crack detection may be detected from multiple camera images by reference to a previous image or images of the same location (i.e., reference to historical camera image or images). In an embodiment, the camera 116 may be panned to capture multiple images or a video of a wider monitoring area. Acquired images may be directly used for crack detection, or alternatively, initially stitched to generate a panoramic image before transmitting the panoramic image to the image processing computer 102 for analysis.

An image quality evaluation can be performed at block 203 to determine whether a current image captured by the camera 116 meets a plurality of image quality metrics. Block 203 can be performed by the detector controller 104 before sending a current image to the image processing computer 102. Alternatively, the image quality evaluation can be performed by the image processing computer 102 before further image processing and analysis are performed. Bad images, such as blurred, overexposed, or underexposed images, need not be processed further. However, based on determining that the current image fails to meet the image quality metrics, block 205 can determine whether an enhancement of the current image meets the image quality metrics. For example, image enhancement algorithms such as contrast enhancement, de-blurring, and the like can be attempted on the current image as an enhancement. Based on determining that the enhancement of the current image fails to meet the image quality metrics, the current image can be rejected and monitoring for another instance of the current image is performed until an image is acquired that meets the image quality metrics. If the current image or an enhancement of the current image meets the image quality metrics, image registration 204 is performed. In an alternate embodiment, block 205 is omitted and block 203 loops back to block 202 when the image quality metrics are not met.

Image registration 204 can be performed by the processor 108 while executing instructions of the progressive defect detector 114 to align the current image to a reference image of the structural component 120. The reference image may be a previously captured image of the structural component 120 that is accessible in the database 112. The reference image and the current images are registered for subpixel level image alignment. Very small variation in feature alignment is expected and can be accounted for via the image registration 204. A rigid model, such as an affine or perspective model may be applied to translate, scale or rotate the current image for subpixel-level alignment with the reference image. A non-rigid model, such as B-Spline, may be used to skew or reshape the current image for feature alignment with the reference image at a subpixel level. Either or both of a rigid model and a non-rigid model can be used in various embodiments.

Structure estimation 206 can be performed by the processor 108 while executing instructions of the progressive defect detector 114. Structure estimation 206 can estimate structures of both the reference image and the current image to estimate linear or curve-like structures using, for example, a multi-scale edge detector (e.g., wavelet-based), a modified local binary pattern (LBP), a structure tensor, or a contour segmentation algorithm. Regardless of the method of structure estimation selected, the structure estimation 206 can be performed on the current image and the reference image to produce a current structure estimate image and a reference structure estimate image. The current structure estimate image and the reference structure estimate image can include estimated structure edges but may also include artifacts due to uneven surfaces, lighting effects, image noise, etc. The structure estimation 206 may be performed in a semi-automated way by highlighting linear or curve-like structures to users/experts for confirmation via a user interface to ensure that parameters used for structure estimation 206 are correct.

Structural masking 208 can be performed by the processor 108 while executing instructions of the progressive defect detector 114. Structural masking 208 may include dilating the reference structure estimate image to obtain a structural mask. Dilation of the reference structure estimate image widens edges to include neighborhood regions in the structural mask. The current structure estimate image can then be masked with the structural mask to identify one or more health monitoring analysis regions including a potential defect or damaged area appearing in the masked current structure estimate image that does not appear in the reference structure estimate image. Regions with structure in the current image but not in the reference image can be identified for further analysis.

Context incorporation 210 may be performed for context-based analysis to reduce false detections. For example, if a repetitive pattern of features is available in the field of view (e.g., line of rivets or bolts) of a hot spot being monitored, context based methods can also be applied. A high-level context driven model (or contextual model) can be applied to a single image or sub-image, or to two images or sub-images. As one example, a contextual model may be incorporated in a matrix for a single image, where at least one of the one or more health monitoring analysis regions can be represented in the matrix. The contextual model may be based on Geometric Layout Context and Physical Context that includes Force Context and Fretting Context. In Geometric Layout Context, prior knowledge representing contextual information that is around the health monitoring analysis regions is estimated and incorporated into the matrix in order to robustly detect cracks and reject false detections. Geometric Layout Context uses information that is around the multiple rivets or other fastener for crack reasoning such as, for example, how the structural component is connected (e.g., by rivets or other fastener), the shape of rivets or other fastener, the number of rivets or other fastener, the layout of rivets or other fastener, the relative distance among rivets or other fastener, and the like. The Geometric Layout Context information may provide information on how cracks will propagate. As there can be repetitive rivets around a location, they have the same geometric structure and their appearance has similar visual properties. The geometric layout context provides a model for a normal appearance of a rivet or other fastener. The processed matrix can be provided to perform a Robust Principle Component Analysis (RPCA).

Also, a Physical Context model for detecting a crack in a single image may be applied. Physical Context denotes an effect of physical phenomena, such as the direction of the external force applied to the structural component or the fretting that may be associated with crack occurrence. Physical Context which includes Force Context and Fretting Context is independent any particular set of image acquisition conditions. Force Context can be included when the additional information it provides about preferential crack propagation would improve the probability of early or correct detection. Force Context denotes an effect of physical phenomena, such as the direction of an external force applied to a location. It is independent of any particular set of image acquisition conditions. Particularly, in Force Context, a crack may initiate from around rivets, and a principal propagation direction of the crack is orthogonal to the principal direction of force exerted to the location. The force information is known prior to implementation of a Force Context model.

Also, the Physical Context model for detecting a crack in a single image may be based on a Fretting Context model. Fretting occurs between two surfaces having oscillatory relative motions of small amplitude and fretting fatigue caused as a result of fretting loading may cause an accelerated nucleation of cracks. Fretting Context usually occurs around rivets along the direction of force. The Fretting Context model predicts coefficient of friction characteristics within a fretted rivet or other fastener during the nucleation of a crack and a finite element method may be used to calculate the state of stress at the rivet location where fretting-nucleated cracks were observed.

In one embodiment to implement the Geometric Layout and Force Contexts, a location based prior $p_l$ and an orientation based prior, $p_o$ is used. The priors $p_l$, $p_o$ are two-dimensional matrices and centered appropriately in image coordinates. The location based prior $p_l$ consists of a radial location based prior, $p_r$, and a directional location based prior, $p_d$. The radial location based prior represents that cracks are likely to occur around rivets or other fastener, and the directional location based prior $p_d$ represents that cracks are likely to occur in a horizontal area if the force is applied along the vertical direction. Also, a simple Gaussian-like distribution may be used to represent the radial location based prior $p_r$ and an exponential distribution may be used to represent the directional location based prior $p_d$. The location based prior $p_l$ is a product of the radial location based prior $p_r$ and the directional location based prior $p_d$ as is shown in Equations (1)-(3).

$$p_r = \exp(-|d_r - r|^2/\sigma_r^2) \quad (1)$$

$$p_d = \exp(-d_d^2/\sigma_d^2) \quad (2)$$

$$p_l = p_r * p_d \quad (3)$$

where:
$d_r$ is the distance to the rivet center;
$d_d$ is a distance to the line orthogonal to the force direction;
r is a radius of the detected rivets;
$\sigma_r$ and $\sigma_d$ are the scale parameters.

The orientation based prior $p_o$ is applied to each line segment. Orientation of each line segment, "orientation", is an angle between a line segment and a crack direction (i.e., a direction which is orthogonal to a force direction). For example, if force is exerted vertically, any line segment with horizontal orientation has a higher probability to be a crack. Similarly, ignoring a normalizing constant, a Gaussian prior is defined according to Equations (4) and (5)

$$p_o = \{\exp(-(|\text{orientation}| - \alpha)^2/\sigma_o^2)\} \text{ if } |\text{orientation}| > \alpha^o \quad (4)$$

otherwise $$p_o = 1 \quad (5)$$

where:
α is an expected angle.

If orientation is close to angle α, the line segment is very likely to be a crack. As the orientation deviates from α, the line segment is less likely to be a crack.

Similarly, a contextual model for crack detection in two images can be performed on the matrix. Particularly, where there is a crack, a displacement d between any two rivets or other fasteners on the surface of the location will change. The magnitude and direction of the displacement d provides an important cue for occurrence of a crack or inelastic deformation. By matching the two images before and after metal fatigue with an image matching/registration algorithm based on image features such as, for example, a Scale-Invariant Feature Transform (SIFT) algorithm, an estimated value for a displacement change δd between rivets may be determined and may indicate a crack or deformation. Further example algorithms include a Harris Corner Detector, a Smallest Univalue Segment Assimilating Nucleus (SUSAN) algorithm, a FAST corner detector, a Speeded Up Robust Features algorithm, SIFT variants, a Phase Correlation, a Normalized Cross-Correlation, a Gradient Location Orientation Histogram (GLOH) algorithm, a Binary Robust Independent Elementary Features (BRIEF) algorithm, a Center Surround Extremas (CenSure/STAR) algorithm, an Oriented and Rotated BRIEF (ORB) algorithm, and the like.

Crack propagation analysis 212 can be performed from multiple images. Crack detection results of a current image with respect to multiple stored references may be used to obtain a crack propagation pattern. Line segment tracking can be applied and statistics for progressive crack detection may be obtained. In an embodiment, progressive crack detection is applied to a series of multiple images of the structural component 120 after structural masking 208 is applied to the images. A plurality of points can be detected in the images after the structural masking 208. Line segment formation is performed by tracking the points, which may include joining crack structures in a tree-like shape. Feature growth is estimated with respect to time between a plurality of the images. For example, estimating feature growth can include determining one or more of: a length of growth with respect to the reference image, a location of growth with respect to the reference image, a length of growth with respect to a sequence of images, and a location of growth with respect to the sequence of images, where the reference image is held constant and the sequence images are ordered in time. The sequence need not include every available image nor does the time between images in the sequence need to be uniform.

Figure 7:
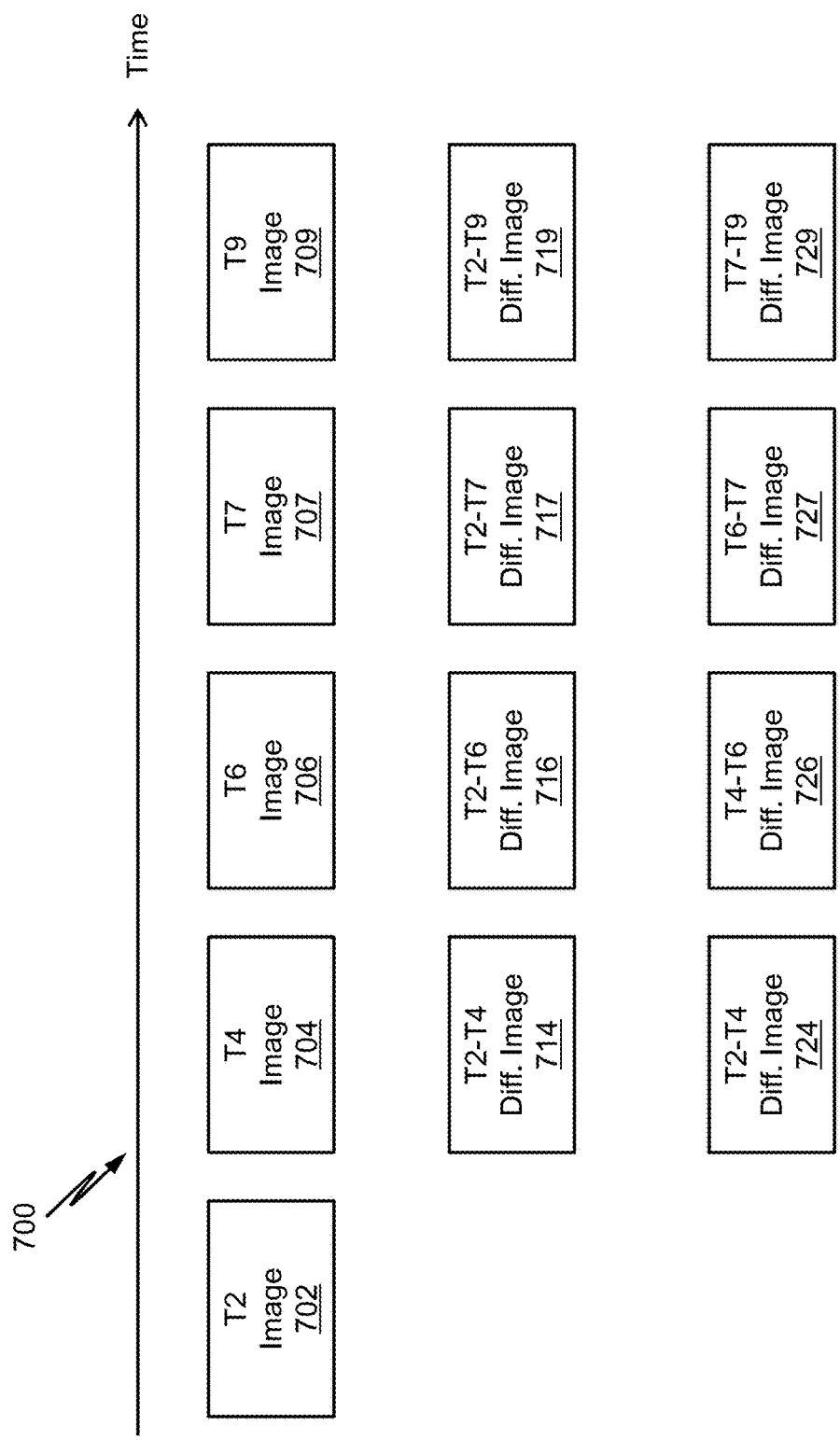
FIG. 7 illustrates an example of image subtraction with regard to various reference images according to an embodiment of the invention.

With reference to FIGS. 1-7, FIG. 3 illustrates an example of applying structure estimation according to an embodiment as may be performed by the structure estimation 206 of FIG. 2. Prior to the structural component 120 of FIG. 1 incurring damage, a reference image is captured by the camera 116 of FIG. 1 in the database 112 of FIG. 1. T2 image 702 of FIG. 7 is an example of a reference image that occurs early in a time sequence 700. T4 image 704 of FIG. 7 is an example of a current image captured by the camera 116 of FIG. 1 that occurs later in the time sequence 700 relative to T2 image 702. As time passes, there can be changes to lighting and alignment, as well as crack initiation and growth between the reference image and a current image. The structure estimation 206 of FIG. 2 may be applied on the reference image (e.g., T2 image 702) and the current image (e.g., T4 image 704) and to produce a reference structure estimate image 302 of FIG. 3 and a current structure estimate image 402 of FIG. 4. A number of differences, due to inaccurate alignment or lighting changes, can appear between the reference structure estimate image 302 of FIG. 3 and the current structure estimate image 402 of FIG. 4 such that simple image subtraction is insufficient. In an exemplary embodiment, the structural masking 208 of FIG. 2 dilates the reference structure estimate image 302 of FIG. 3 to obtain a structural mask 502 of FIG. 5. The structural masking 208 of FIG. 2 can mask the current structure estimate image 402 of FIG. 4 with the structural mask 502 of FIG. 5 to identify one or more health monitoring analysis regions 602 of FIG.

Figure 4:
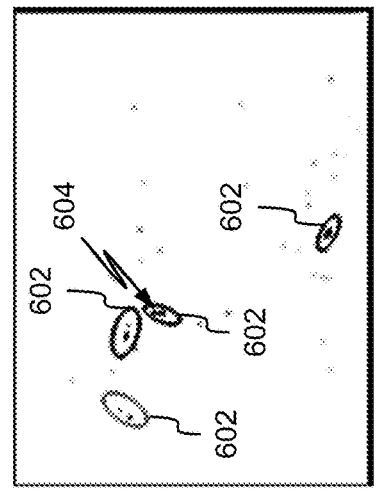
FIG. 4 illustrates an example of applying structure estimation to a current image according to an embodiment of the invention.
Figure 5:
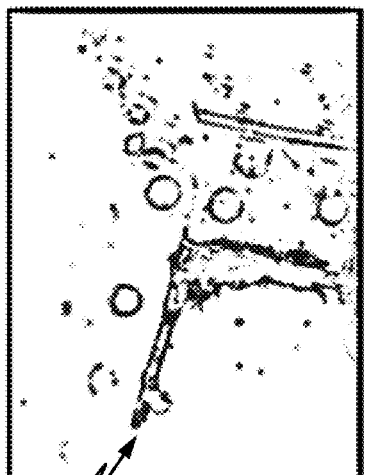
FIG. 5 illustrates an example of a structural mask according to an embodiment of the invention.
Figure 6:
FIG. 6 illustrates an example of detected cracks according to an embodiment of the invention.

6 that include a potential defect or damaged area 604 (e.g., a detected crack) appearing in the masked current structure estimate image 402 of FIG. 4 that does not appear in the reference structure estimate image 302. The context incorporation 210 of FIG. 2 can also be used to reduce false positives in identifying health monitoring analysis regions 602 as well as detected cracks within the health monitoring analysis regions 602.

With continued reference to FIG. 7 an example of image subtraction with regard to various reference images is depicted according to an embodiment. FIG. 7 further depicts a sequence of images as T2 image 702, T4 image 704, T6 image 706, T7 image 707, and T9 image 709. When a progressive crack propagation determination is performed by crack propagation analysis 212 of FIG. 2, comparison relative to a same reference image for crack growth is illustrated by a sequence of difference images as T2-T4 difference image 714, T2-T6 difference image 716, T2-T7 difference image 717, and T2-T9 difference image 719, where T2 image is the reference image. Comparison for crack propagation analysis relative to a sequence of images for crack growth is illustrated by another sequence of difference images as T2-T4 difference image 724, T4-T6 difference image 726, T6-T7 difference image 727, and T7-T9 difference image 729, where previous images become the reference images for the next images in time. Total crack propagation can be captured in the difference images 714-719, while incremental crack growth can be captured in the difference images 724-729. Accordingly, depending upon which images are selected as a reference image and a current image, different types of analysis can be supported. The selection of a reference image and a current image can be adaptive based on the remaining life of structures. The closer to the end of the life of a structure, the more often should the structure be inspected.

Technical effects include crack detection and propagation analysis using structural masking that is robust to ambient lighting and misalignment errors. Lighting variations and misalignment tolerances around structures are accommodated using structural masking as described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of structural masking for progressive health monitoring of a structural component, comprising:
receiving a current image of the structural component;
aligning, by a processor, the current image and a reference image of the structural component by applying a non-rigid model to skew or reshape the current image for feature alignment with the reference image at a subpixel level;
performing, by the processor, a structure estimation on the current image and the reference image to produce a current structure estimate image and a reference structure estimate image;
generating, by the processor, a structural mask from the reference structure estimate image; and
masking, by the processor, the current structure estimate image with the structural mask to identify one or more health monitoring analysis regions comprising a potential defect or damaged area appearing in the masked current structure estimate image that does not appear in the reference structure estimate image.

2. The method of claim 1, further comprising:
performing an image quality evaluation to determine whether the current image meets a plurality of image quality metrics;
based on determining that the current image fails to meet the image quality metrics, determining whether an enhancement of the current image meets the plurality of image quality metrics; and
based on determining that the enhancement of the current image fails to meet the image quality metrics, rejecting the current image and monitoring for another instance of the current image.

3. The method of claim 1, wherein aligning the current image and the reference image further comprises applying a rigid model to translate, scale or rotate the current image for subpixel-level alignment with the reference image.

4. The method of claim 1, wherein the structure estimation comprises estimating linear or curve-like structures.

5. The method of claim 1, wherein generation of the structural mask is obtained by dilation of the reference structure estimate image.

6. The method of claim 1, wherein progressive crack detection is applied to multiple images of the structural component after structural masking is applied to the images by performing additional steps comprising:
detecting a plurality of points in the images after the structural masking;
performing line segment formation by tracking the points; and
estimating feature growth with respect to time between a plurality of the images.

7. The method of claim 6, wherein estimating feature growth further comprises determining one or more of: a length of growth with respect to the reference image, a location of growth with respect to the reference image, a length of growth with respect to a sequence of images, and a location of growth with respect to the sequence of images.

8. A system for progressive health monitoring of a structural component using structural masking, comprising:
an image processing computer including a processor and memory; and
a camera that captures a current image of the structural component;
wherein the memory comprises instructions stored thereon that, when executed by the processor, cause the system to:
align the current image and a reference image of the structural component by applying a non-rigid model to skew or reshape the current image for feature alignment with the reference image at a subpixel level;
perform a structure estimation on the current image and the reference image to produce a current structure estimate image and a reference structure estimate image;
generate a structural mask from the reference structure estimate image; and
mask the current structure estimate image with the structural mask to identify one or more health monitoring analysis regions comprising a potential defect or damaged area appearing in the masked current structure estimate image that does not appear in the reference structure estimate image.

9. The system of claim 8, wherein the memory further comprises instructions stored thereon that, when executed by the processor, cause the system to:
  perform an image quality evaluation to determine whether the current image meets a plurality of image quality metrics;
  based on determining that the current image fails to meet the image quality metrics, determine whether an enhancement of the current image meets the plurality of image quality metrics; and
  based on determining that the enhancement of the current image fails to meet the image quality metrics, reject the current image and monitor for another instance of the current image.

10. The system of claim 8, wherein aligning the current image and the reference image further comprises application of one of: a rigid model to translate, scale or rotate the current image for subpixel-level alignment with the reference image, and a non-rigid model to skew or reshape the current image for feature alignment with the reference image at a subpixel level.

11. The system of claim 8, wherein the structure estimation comprises estimating linear or curve-like structures.

12. The system of claim 8, wherein generation of the structural mask is obtained by dilation of the reference structure estimate image.

13. The system of claim 8, wherein progressive crack detection is applied to multiple images of the structural component after structural masking is applied to the images based on further instructions that cause the system to:
  detect a plurality of points in the images after the structural masking;
  perform line segment formation by tracking the points; and
  estimate feature growth with respect to time between a plurality of the images.

14. The system of claim 13, wherein the estimate of the feature growth further comprises a determination of one or more of: a length of growth with respect to the reference image, a location of growth with respect to the reference image, a length of growth with respect to a sequence of images, and a location of growth with respect to the sequence of images.

* * * * *